Sept. 26, 1967        B. B. SKOGGARD        3,344,007
HOLLOW ARTICLES, DIE ELEMENTS AND METHODS OF FORMING THE SAME
Original Filed May 5, 1961        4 Sheets-Sheet 1
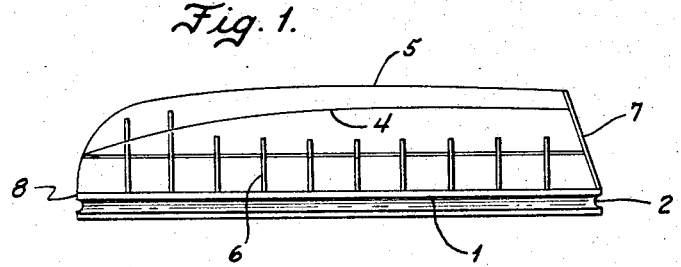
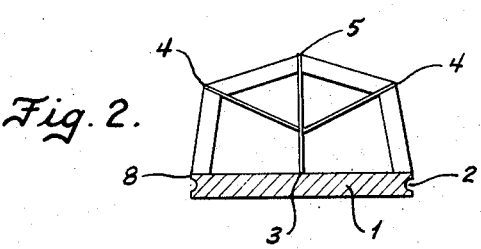
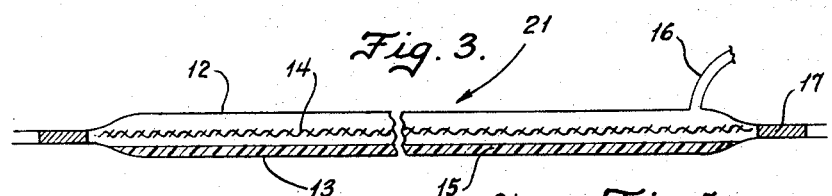
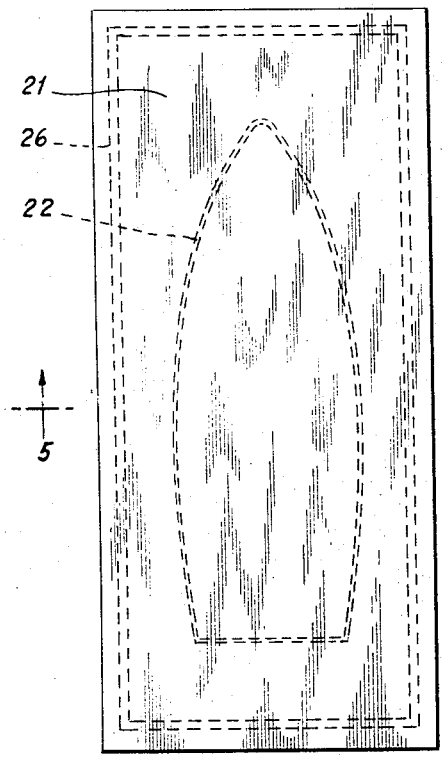
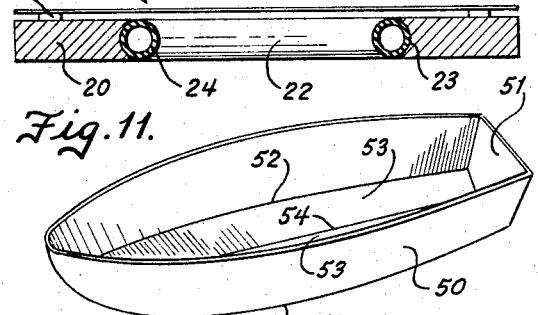
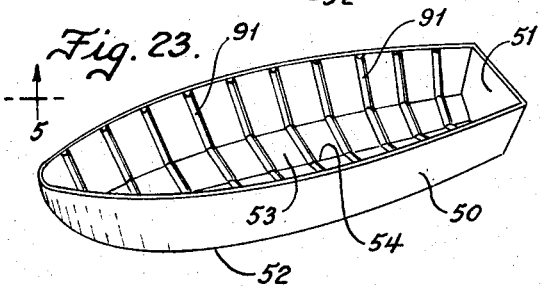
INVENTOR.
BRUNO B. SKOGGARD
BY
ATTORNEY.

Sept. 26, 1967  B. B. SKOGGARD  3,344,007
HOLLOW ARTICLES, DIE ELEMENTS AND METHODS OF FORMING THE SAME
Original Filed May 5, 1961  4 Sheets-Sheet 2

INVENTOR.
BRUNO B. SKOGGARD
BY
ATTORNEY.

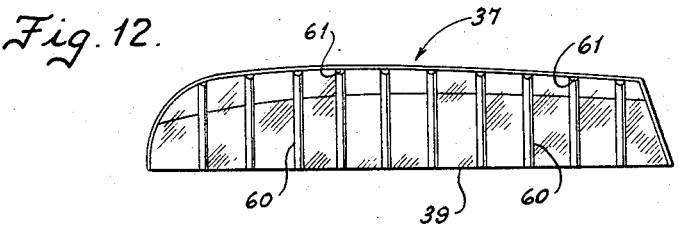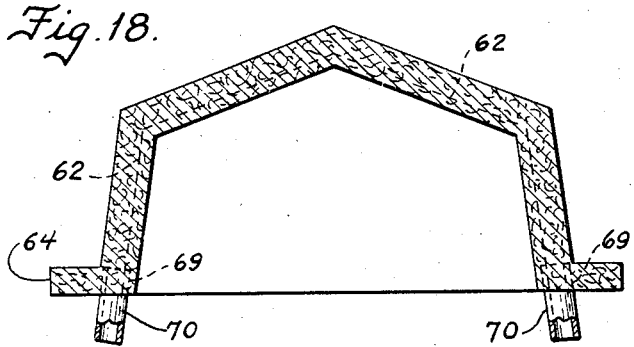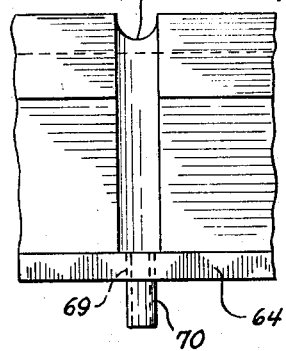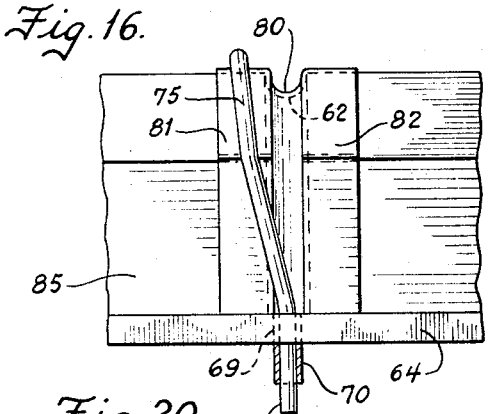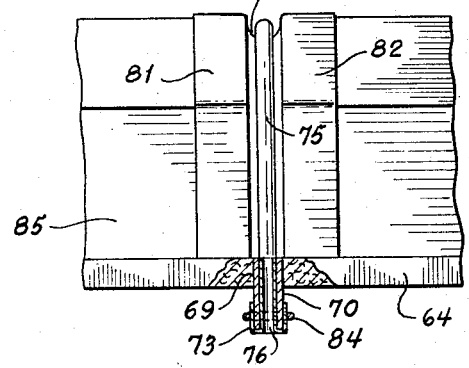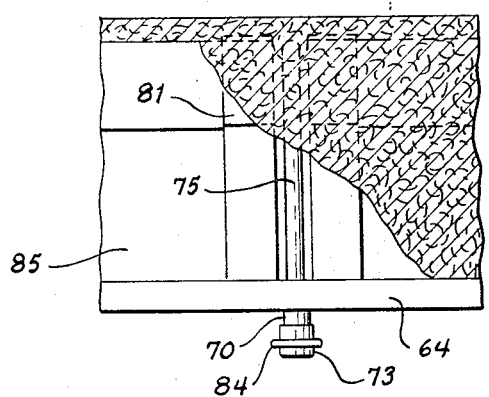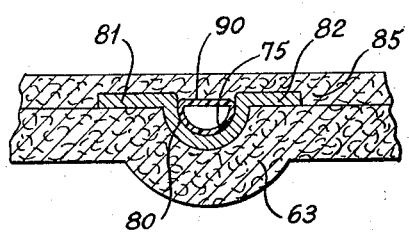

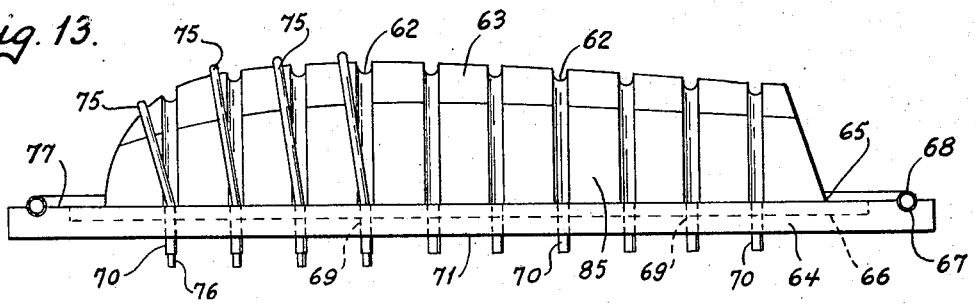
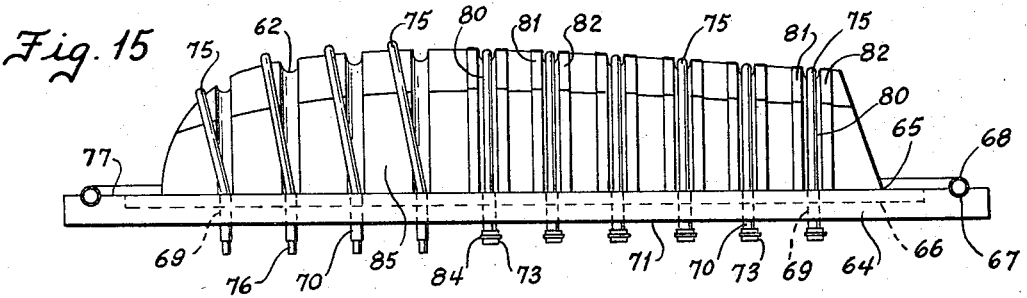
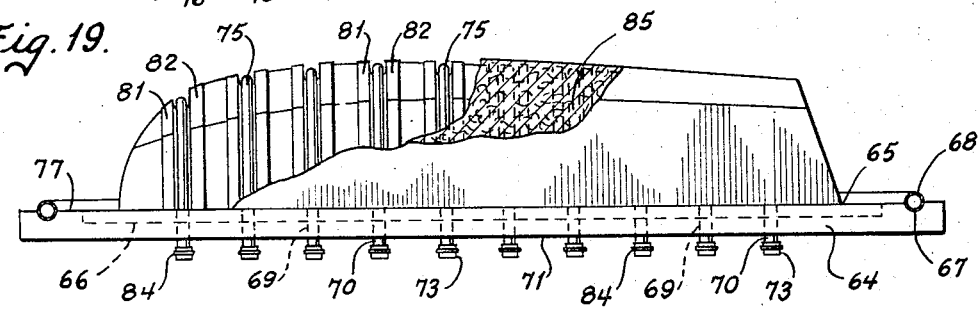
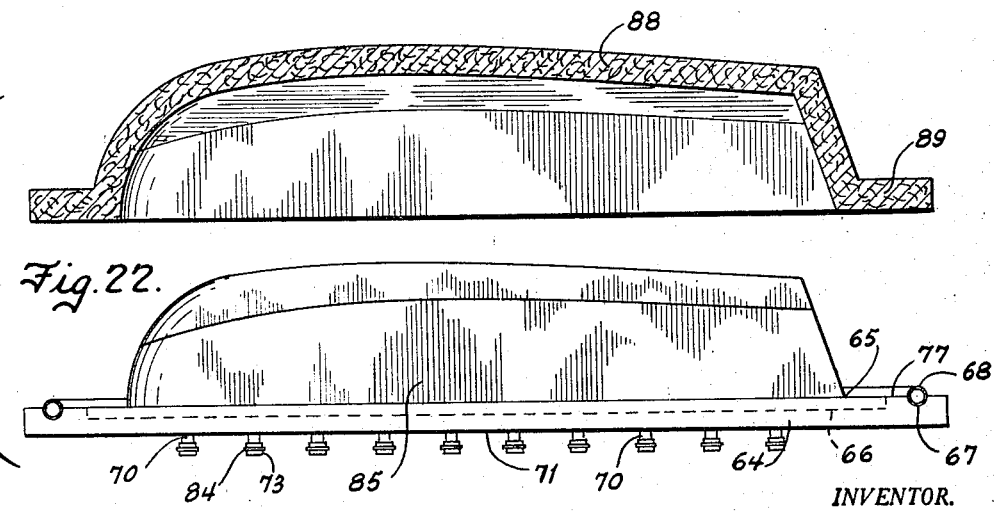

United States Patent Office 3,344,007
Patented Sept. 26, 1967

3,344,007
HOLLOW ARTICLES, DIE ELEMENTS AND
METHODS OF FORMING THE SAME
Bruno Bengt Skoggard, Cold Spring Harbor, N.Y., assignor, by mesne assignments, to American Cyanamid Company, Wayne, N.J., a corporation of Maine
Continuation of application Ser. No. 108,038, May 5, 1961. This application Feb. 24, 1966, Ser. No. 536,520
15 Claims. (Cl. 156—212)

ABSTRACT OF THE DISCLOSURE

A blank for a master shell to be used in making die elements which comprises a sandwich formed of a pair of sheets of elastomeric film, a sheet of stretchable reinforcing material positioned between said sheets of elastomeric film, a settable plastic impregnating said reinforcing sheet and filling the remaining space between said elastomeric film sandwich, and to the method of preparing the same.

---

This application is a continuation of my earlier application Serial No. 108,038, filed May 5, 1961, now abandoned entitled "Hollow Articles, Die Elements and Methods of Forming the Same."

The invention relates to the method of forming mold elements for use in making hollow articles, the method of utilizing such mold elements and the articles produced by the use thereof. More particularly, the invention is concerned with the production of reinforced plastic shells, of which boats, aircraft pontoons or automobile bodies are nonlimiting illustrations, with the first step being the novel method of forming mated mold elements out of reinforced plastic material followed by the utilizing of those molds in particular manner for the economical production of reinforced plastic elements.

The tools or die elements normally employed for the production of reinforced plastic shells, such as boats, automobile bodies or parts thereof, normally utilize initially rigid materials. The original plug against which cavity molds of such materials are made is generally formed out of wood. Then the matched dies utilized to pressure mold reinforced plastic parts exteriorly matching the original plug, are usually machined out of block steel. Obviously, this is an expensive, time consuming procedure and is not worth doing unless large numbers of the particular product are demanded.

The instant invention reverses all this and renders it economical to manufacture even one or two elements of a single shape. It does so by the making of the molds, or matched dies, for use in forming those elements out of reinforced thermosetting or even thermoplastic material. First, the invention provides for the making of a master shell comparable to the eventual structure to be produced. When this master shell has been formed and rigidified the female of the pair of matched dies, or molds, is laid up on the outer surface thereof by means of fiber glass cloth saturated with resin. When this has been completed, the male die is laid up in the same way on the inside of the master shell. When these male and female molds or dies have been cured, they are separated from the master shell. Now they are ready for use for the formation of the desired product. The master shell, in accordance with the invention, has surfaces of such smoothness and of such mold release characteristics that the working surfaces of the molds or die elements formed thereagainst are likewise rendered smooth and have the appearance of being highly polished. Such smoothness is likewise imparted to the elements made by the use of the die elements.

The elements or products of the invention are formed in generally the same manner as that employed for forming the die or mold elements, involving the laying up a reinforcing material saturated with plastic. The material may either be hand laid against the interior surface of the female mold, or be similarly laid on the outer surface of the male mold. Then the molds are brought together with the reinforcing material and plastic or resin therebetween, and pressure is applied to tend to force the mold elements towards each other. Advantageously, this pressure is effected by drawing a vacuum between the mold elements, thus leaving it to the atmosphere to provide the pressure.

Should special reinforcement of the ultimate product be desired, an illustration of which is internal reinforcing ribs for aircraft pontoons or floats, this is readily accomplished in one manner by applying suitable rib forming elements to the interior of the master shell prior to the laying up of the fiber glass and plastic material for the making of the male mold. Thus, the male mold when formed is comparably recessed. Then when the reinforcing material and resin are applied to the male mold for the forming of the ultimate product, such reinforcing material is first laid into the concave recesses. This is followed by the seating of rib reinforcing elements within the recesses. Next, the layer or layers of the material to form the skin or body of the ultimate member is laid thereover. After that, the female mold is brought into position over the laid up body forming and reinforcing material, curing under pressure or vacuum is effected and the ultimate product has built-in interior ribs to strengthen it. In this way, a structure made out of material, such as a fiber glass cloth and a resin, can be produced which is not only stronger and tougher than alloys of light weight metals heretofore employed in the making of comparable elements, but the product is also decidedly more rigid than those heretofore made of such metals. Additionally, the product is cheaper and more corrosion resistant.

Accordingly, an object of the invention is to simplify the production of high strength light weight hollow elements.

Another object is to effect such production in a highly economical manner.

Another object is to effect the economical production of reinforced plastic hollow elements which are tougher, stronger and more rigid than those made out of strong, light weight metal alloys and are even lighter in weight than comparable elements made out of such metal alloys.

Still another object is to provide novel methods for the economical production of die elements for use in the forming of hollow reinforced plastic members.

A further object is to provide methods for the forming of such die elements which proceed directly through manipulative steps from a model or simularization of the eventual product.

A further object is to provide for the economical direct production of reinforced plastic members having smooth finished surfaces thereon.

A still further object is to provide for the economical production of such elements incorporating special stiffening formations in the structure thereof.

A more detailed object is to provide for the quick and simple formation of master shells simulating the ultimate shells from which master shells sets of die members can be easily and effectively formed.

Still further and more detailed objects of the invention will in part be obvious and in part be pointed out as the description of the invention taken in conjunction with the accompanying drawing proceeds.

In that drawing:

FIG. 1 is a side elevation of one form of pattern or model that may be employed in accordance with the invention.

FIG. 2 is an end elevation thereof viewing FIG. 1 from the left hand end.

FIG. 3 is a greatly enlarged fragmentary vertical sectional view of the form of envelope employed in the making of a master shell in accordance with the invention.

FIG. 4 is a top plan view of such an envelope when mounted over the top plate of a suction box or vacuum chamber with an opening of proper size formed in the plate for the reception of the pattern.

FIG. 5 is an enlarged sectional view taken on line 5—5 of FIG. 4 and looking in the direction of the arrows.

FIG. 11 is a perspective view showing what the master shell, or comparable product as produced by the die elements of FIG. 10, would look like.

FIG. 12 is a longitudinal sectional view of a master shell similar to that of FIGS. 8–11 but having rib elements applied to the interior thereof comparable to the reinforcement to be similarly formed on the final product.

FIG. 13 is a longitudinal elevation of the male mold formed from the shell of FIG. 12 showing the commencement of the positioning of the reinforcing tubes thereover.

FIG. 14 is an enlarged fragmentary elevational view of a portion of the male die of FIG. 13 showing the recess therein.

FIG. 15 is a view similar to FIG. 13 but showing strips of reinforcing material and resin laid into the recesses and extending out to border the same, with certain of the reinforcing tubes seated in the recesses, while others are positioned off to one side thereof.

FIG. 16 is an enlarged fragmentary elevational view of a portion of the male die with a tube positioned to one side of a recess.

FIG. 17 is a view similar to FIG. 16 but showing one of the tubes seated in place in its recess.

FIG. 18 is a transverse sectional view of the construction as shown in FIG. 17.

FIG. 19 is an elevational view similar to FIG. 15 but with all of the tubes in place and showing layers of fibrous reinforcing material and plastic laid up on the male mold with various of said layers partially broken away to show the construction underneath them.

FIG. 20 is an enlarged fragmentary elevation with portions of the layers broken away and showing the laid up formation of FIG. 10 in further detail.

FIG. 21 is a further enlarged fragmentary section of the laid up formation taken across one of the reinforcing tubes.

Figure 6:
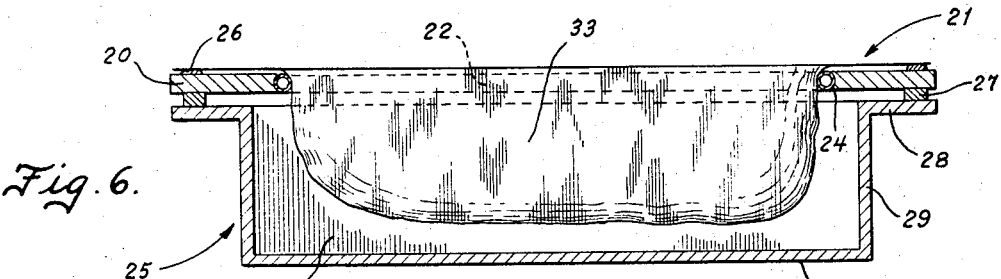
FIG. 6 is a longitudinal sectional view of a suction box having a top plate opening formed therein and into which an envelope for use in forming the master mold has been drawn by suction.
Figure 7:
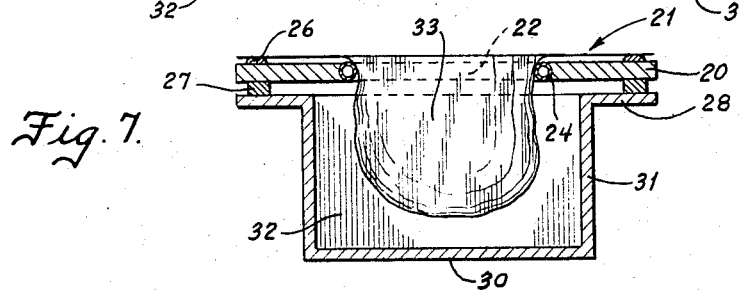
FIG. 7 is a transverse sectional view thereof.
Figure 8:
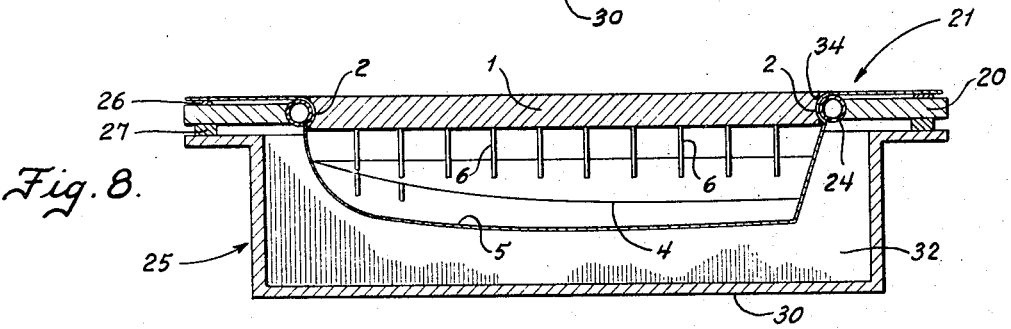
FIG. 8 is a view similar to FIG. 6 showing the condition after the pattern member of FIG. 1 has been introduced into the envelope as drawn down in FIG. 6 but after the release of the vacuum so that the envelope has returned to hug the pattern.

FIG. 22 is an exploded view showing the male mold or die of FIG. 19 with the fibrous material and resin completely laid up thereover ready for pressure forming into a finished product shell and showing the female mold or die in vertical section as it would appear when being brought into position over the laid up male die ready for the final pressure molding step; and FIG. 23 is a perspective view of a small boat hull with transverse reinforcing members resulting from the various lay up and molding steps of FIG. 16–22.

Though the showing in the accompanying drawing and the description thereof to follow will, for the sake of simplicity of disclosure, be directed to the forming of the hull of a small boat, first without reinforcement, and then transversely reinforced, it is of course to be understood that the invention is in no way limited by such showing or description. On the contrary, the invention readily lends itself to the forming of a wide variety of strong, tough, pressure molded, light weight hollow elements of which a small boat is principally a good example from the standpoint of an open sided shell. The invention is also readily adaptable to the forming of such varied structures as automobile body parts or complete bodies, housings for appliances, covering housings for machinery, a wide variety of protective housings and housing elements as well. In the aircraft field, products made in accordance with the invention are presently meeting the need for strong, tough, rigid light weight pontoons or floats for seaplanes. Here a pair of shells internally ribbed for rigidity are secured together resulting in a stronger, lighter-weight and considerably more economical construction than the metal ones heretofore employed. Other aircraft parts can of course be constructed by following the teachings of the invention.

Reverting then to the specific embodiments of the invention as shown in the accompanying drawing, the starting point is an original plug. The plug here, as shown in FIGS. 1 and 2, is merely that of a frame for a small boat. For the full details with regard to the structure of such a frame reference is made to my co-pending application Serial No. 848,164, filed October 22, 1959, now U.S. Patent No. 3,072,929, entitled Hollow Structures and Methods of Forming Same. For so much of the detail as is needed to proceed with here, the plug or framing will be seen to have a rather substantial base 1 which extends throughout the outline of that portion of the framing to form the open mouth of the eventual element. The base 1 is shown as girdled by a semicircular recess 2, the purpose of which will appear shortly hereinafter.

The type of framing here employed is formed up from the base 1 in a form like leaves of a book extending throughout the longitudinal extension of the base and radiating outwardly in longitudinally spaced relationship from a center line 3. A pair of such longitudinally extending leaves suitably contoured on their free edges extend up to form the chine lines 4 of the ultimate boat hull. A center leaf extends up between these to establish the keel line 5. These leaves ar maintained in their spaced angular relationship by transverse angular separator members 6 positioned at spaced intervals throughout the length of the construction. A transom member 7 at the appropriate angle lies across the stern of the framing. With the exception of the base 1, all of the frame elements may be formed of corrugated board, other pressed boards, or if desired, may be made of light plywood. The transverse members would be made of similar material. The base 1 would preferably be made of wood of sufficient thickness to enable the groove 2 to be formed therein.

It will be appreciated that when a skin of resilient stretchable material is drawn over this form of longitudinally lined framing, it will lie straight across between the keel member 5, the chine members 4 and the shear line at 8 around the upper portion of the base 1. It will also be appreciated that the exterior dimensioning of the framing will be sufficiently less than that of the ultimate member to be formed to provide for the thickness of such member.

The stretchable member to be employed over the plug, or framing, of FIGS. 1 and 2, and to eventually form the master shell for use in laying up fiber glass reinforced plastic material on both the inside and outside thereof, for the forming of male and female die members, is fragmentarily shown in greatly enlarged scale in FIG. 3. Here an envelope is formed of a pair of opposed elastically stretchable or elastomeric plastic film-like elements 12 and 13. Polyvinyl alcohol film material is an example of a suitable elastomeric material having mold release properties for the elements 12 and 13. This envelope is internally reinforced by a layer of stretchable cloth 14 having elastic properties which extends throughout the confines of the envelope. Non-limiting illustrations of suitable cloth material are cotton jersey, a two-way stretch nylon, or various knitted fabrics. This cloth is impregnated by, and the remaining space between the films 12 and 13 is filled by a suitable thermosetting plastic material such as a polyester or an epoxy resin. This resin is illustrated at 15, though actually little of it exists other than that which impregnates and clings to the cloth 14 when this envelope is ready for use.

For enabling this envelope to be put into condition for use, one or more conduits, such as 16, in communication with its interior, are connected with a vacuum pump and all of the air is drawn out from the interior of the sandwich making a thin structure contrasting materially in appearance with the initial assembly as shown in FIG. 3. Thus the films 12 and 13 collapse towards each other and cling closely to the cloth 14. This evacuated sandwich is then secured over a plate as illustrated in FIGS. 4 and 5. The films 12 and 13 are, of course, sealed together around the borders of the sandwich as illustrated at 17. The evacuation of the air from between the sheets makes a thin sandwich and eliminates everything which might prevent the sandwich and the films being drawn down evenly. Care is taken to see that none of the resin is drawn out.

The plate 20, for which the vacuum sandwich, now generally indicated at 21, forms an overlay, has an aperture 22 formed therein of a size to sealingly receive the base 1 of the frame or plug of FIGS. 1 and 2. The periphery of this recess 22 is provided with a surrounding concave recess 23 mated to the recess 2 of the base 1. A pneumatic sealing tube 24 is seated in the recess 23 so that at the appropriate time a tight seal can be made between the base 1 and the plate 20.

If the plate 20 is not already in place over the open mouth of a suitable vacuum box as generally indicated at 25, it is positioned there once the vacuum sandwich is secured in place on it by means of suitable peripheral sealing means as shown at 26 in FIGS. 4–9. Likewise the plate 20 is peripherally sealed at 27 against the outwardly flanged portion 28 around the end walls 29 and side walls 31 of the vacuum box 25. The bottom of the vacuum box is indicated at 30.

Once the sandwich, the plate and the vacuum box are in the proper sealed relationship as just described, the pressure within the interior 32 of the vacuum box 25 is reduced. Thus the portion 33 of the sandwich 21 overlying the opening 22 in the plate 20 is pushed down by atmospheric pressure into the interior 32 of the vacuum box. This is due to the fact that the films 12 and 13, as well as the reinforcing cloth 14, are suitably stretchable and the resin within the sandwich 1 has not yet set.

When the portion 33 of the sandwich 21 has sunk down sufficiently into vacuum box interior or chamber 32, the plug or framing of FIGS. 1 and 2 is brought into use. It is reversed from the FIG. 1 position and is seated down into the cavity provided by the portion 33 of the sandwich until it is fully positioned therein with the peripheral recess 2 of its base 1 mated all around with the pneumatic tube 24 but with a portion 34 of the sandwich 21 extending part way around the pneumatic tube 24 between the same and the recess 2. With the plug or frame seated in place in the sagged portion 33 of the sandwich 21 as just described, the air pressure within the chamber 32 of the vacuum box 25 is allowed to increase. This has the effect of causing the sagged portion 32 of the sandwich to tightly hug the plug or framing and follow the contours thereof. The pressure is left that way for a sufficient length of time to enable the resin within the sandwich 21 to set. When it does so, the sandwich, due to the toughness of the resin and the reinforcing cloth impregnated by it, becomes a tough hard master shell against the surfaces of which the lay up of the male and female members may be proceeded with.

Figure 9:
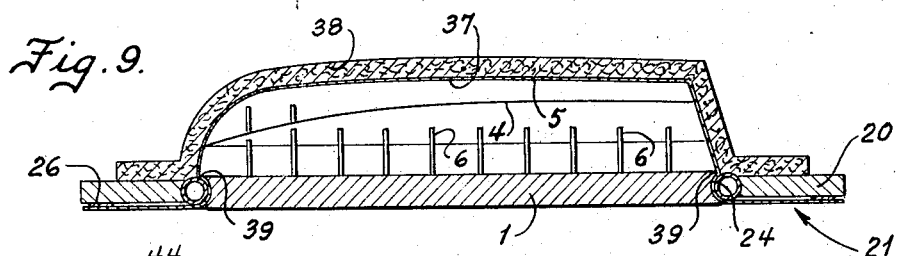
FIG. 9 is a vrtical section illustrating the condition after the envelope has been set and cured about the pattern in order to form the master shell and additionally showing the material forming the female mold laid up on the exterior of that master shell.

Preferably at first the plate 20 is removed from the vacuum box and inverted on a suitable supporting surface leaving the plug or framing within the now hardened master shell 37 to reinforce that master shell while the female mold is formed over it. This female mold, as indicated at 38 in FIG. 9, is suitably laid up on the master shell by applying the desired number of layers of fiber glass and suitable resin until a thickness of die wall calculated to provide the desired strength for the pressure casting of the production shells is achieved. When this has been done as seen in FIG. 9, the plug or framing is removed from the interior of the master shell 37. This may be done by deflating the sealing tube 24 which will let the base 1 and the rest of the plug pass by that tube. Next the outlying parts of the master shell are trimmed off around the line 39 at the mouth of the female mold so that all that remains of the master shell is the portion thereof within the female mold. The plate 20 and its tube 24 are then taken away carrying with them the cutaway extending portion of the sandwich 21 outwardly of the line 39.

Figure 10:
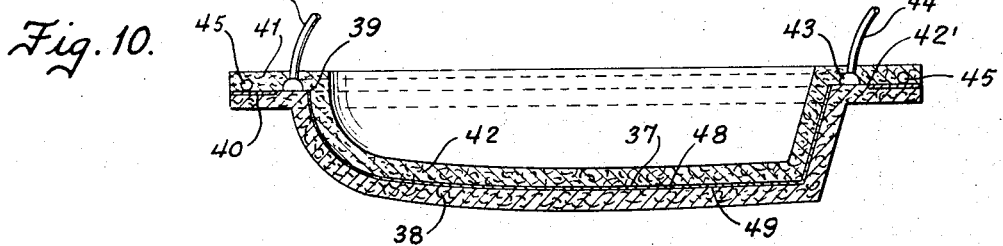
FIG. 10 illustrates the next step wherein the pattern and supporting platform has been removed and the male mold has been laid up inside of the master shell.

Advantageously, the female mold 38 with the shell 37 inside of it is turned upside down and the male mold is laid up inside of the master shell 37, as seen in FIG. 10, by means of a suitable number of layers of resin and reinforcing material such as fiber glass or fiber glass cloth in the same manner followed in the lay up of the female mold 38. Additional specific features to note here, however, are the elements interposed between the flange 40, extending outwardly as an integral extension around the female mold 38, and the flange 41, similarly extending around the male mold 42, and overlying the flange 40.

In the first place, inasmuch as the sandwich 37 is faced on both sides with a smooth surfaced plastic film of material suitable for release of the resin and fiberglass laid up on it, the portions of the male and female die members which lie against the inner and outer surfaces of the master shell will not stick to those surfaces so are readily separable therefrom. In fact, in addition to such freedom of separation the working faces of the die or mold elements will also, when the resin is cured, present smooth surfaces comparable to those of those of the plastic films which form them. Inasmuch, however, as the master shell terminates around the line 39, provision must be made on the upper surface of the flange 40 before the flange 41 of the male mold is formed thereover for adequate spacing between those flange faces to accommodate the peripheral extension of the laid up resin and reinforcing material when the die elements are used for production purposes. Furthermore, there must be provision in the space between the flanges 40 and 41, closely adjacent the line 39, for drawing a vacuum between the working surfaces of the die elements when such product forming resin and reinforcing material is in position between such surfaces. The drawing of the vacuum between the working surfaces of the die elements results in those die elements being pressed together by exterior atmospheric pressure to effectively and tightly press the material forming the product into the dense wall desired. Additionally, in drawing the vacuum unwanted air is drawn out from between the die elements eliminating air bubbles or other defects in the structure due to the presence of air. Finally, there must be means for providing an air seal around the periphery of the flanges 40 and 41 outwardly of the vacuum producing means.

To meet the requirements just mentioned the first step is to provide a layer of spacing and/or release material 42 on the upper surface of the flange 40 of the female die. Then a suitable channel forming member 43, here shown as half a tube with its open face extending downwardly, is positioned on the release material 42 and is extended all the way around the periphery of the flange 40 closely adjacent the line 39. At suitable spaced positions around its periphery the channel forming member 43 has tubes 44 extending thereinto through the upper surface thereof. These are for connection to a suitable vacuum source in order to pull a vacuum in the channel formed by the member 43 when the die elements are put to use.

Finally, a pneumatic tube 45 is positioned on top of the release material on the flange 40—40 outwardly of the channel forming member 43 and is likewise extended all the way around the periphery of the flange 40. This tube is preferably seated down through the release material since, when inflated, it forms the exterior seal between the die members in order to enable the vacuum to be drawn through the channel 43. Once the release material 42, the channel forming member 43 and the pneumatic tube 45 are seated in place, the forming of the male die member 42 can commence. In forming that die member the layers of fiberglass cloth or other suitable reinforcing material and the resin are laid right up over the conduit members 43 and 45 and outwardly across the release material 42. Suitable conduit connections may of course be made with the pneumatic tube 45 to increase the air pressure therein.

Once the material for the formation of the male mold 42 has been laid up and allowed to set and harden, the die or mold members 38 and 42 are separated, the master shell 37 is removed therefrom, and is ready for use in making other die sets, as may be desired, in the manner just described. The separated die elements are ready for use in the making of production members.

It is first to be appreciated that the opposed working faces of the dies are hard and smooth, resulting from being made against the smooth plastic faces of the sandwich, as pointed out above. Thus there is little need for the application of release material to those working faces to prevent the reinforced plastic elements to be formed between the dies from sticking to those surfaces. However, coatings of suitable release material as is well known in the art may be applied if desired, or if found necessary in any particular situation.

In the making of production elements, it is preferable, as will be seen hereinafter by reference to FGIS. 13, 15, 19 and 22, directed to a more detailed form of the invention, to use the male die member 42 as the lay up member. For this purpose it is reversed from the position shown in FIG. 10 with its forming surface extending convexly upwardly. When so positioned the desired numbers of layers of resin and fiber glass cloth or other reinforcing material are laid onto the forming surface 48 of the die member 42. When the desired number of these have been laid up the female die member 38 is positioned on top of the laid up material on the male die member. At this point the pneumatic tube 45, if not in a permanently inflated condition, will then be inflated to a sufficient extent to form a seal between the flanges 40 and 41. Following this a vacuum will be drawn in the zone occupied by the laid up material by means of the channel formed by the member 43. As soon as this vacuum is drawn the die members 38 and 42, as well as their flanges 40 and 41, will be strongly forced towards each other by the atmospheric pressure acting against their outer surfaces. This force will exist so long as the vacuum is maintained through the channel 43 and that vacuum will be maintained until the curing of the resin in the production elements has been completed. The production element will then be removed and, as a result of employing the plug of FIGS. 1 and 2, it will be found to be a hull for a simple, hard chine small boat as shown in FIG. 11. This boat will have sides 50, a transom 51, chines 52, and bottom sections 53 meeting at the keel line 54. It will be one continuous tough shell of reinforced plastic with smooth interior and exterior surfaces as a result of having been pressed between the smooth die surfaces 48 and 49 of the molds 42 and 38.

If made out of fiber glass cloth reinforcing suitable resin, such as epoxy, the boat hull of FIG. 11 will be found to be of extremely light weight and to have an extremely strong, tough and dense wall formation, though possessed of a certain amount of flexibility. Also the cost of producing such a high class product wll be found to be extremely low.

Inasmuch as the boat hull of FIG. 11 would normally have gunnel strakes applied around its upper edge and have seats and possibly flotation members secured inside of it and transversely of it, the flexibility of the structure would be reduced sufficiently to be of no consequence. For certain other structures, however, where rigidity is required throughout the basic structure in addition to the other favorable characteristics of structures made in accordance with the invention, additional steps may be readily taken to achieve such end.

Again, for simplicity of disclosure, these steps will be shown as taken for the rigidifying of a simple boat hull as shown in FIG. 11. The starting point is the master shell 37 produced as described in the foregoing which shell is shown in FIG. 12 with additional members applied thereto to provide transverse stiffeners in the ultimate product.

In order to augment this shell, 37, so that die or mold elements can be made from it, which in turn can be used for making production members equipped with stiffeners, counterparts of those stiffeners substantially as they will appear in the final product, are applied to the master shell. These stiffener counterparts, as shown in FIG. 12, are in the form of transverse rib members 60, which commence at the edge line 39 of the shell at one side thereof, extend continuously down into the shell across the bottom thereof and back up the opposite side. These rib members 60 may be formed to the cross sectional shape desired for their counterparts on the final product. Here they are shown as half round in cross section. They may be formed of any suitable plastic, or other material of sufficient rigidity to retain its shape as layers of resin and fiber glass are laid thereover in the course of the laying up of the male mold inside of the master shell. Advantageously, the rib members have their outer surfaces 61 glued to the interior of the master shell.

As here seen, there is a plurality of the ribs 60 all extending completely transversely of the interior of the shell 37 and positioned in spaced relationship with respect to each other along the whole of the extent of the shell. This is illustrative of the type of ribbing that would be required in order to stiffen a small boat hull which has no other interior members. The same type of ribbing is also effective for stiffening the opposed shell elements used in forming aircraft floats or pontoons. Should a different type of strengthening be desired, however, the length, direction, spacing and other aspects of the ribbing can obviously be changed and applied to the master shell in desired manner. Mating channels would, accordingly, be formed in the outer surface of the male die or mold, and by adopting the teaching of the invention to follow, the final product would be corresponding reinforced.

The manner in which the male and female molds are laid up against the interior and exterior of the master shell of FIG. 12 is, save for the ribbing 60, exactly the same as carried out in the makeup of the mold or die elements 38 and 42. Using the FIG. 12 shell, however, the resultant male mold has transverse channels 62 formed therein (FIGS. 13 and 14) corresponding in size, position and extent to the ribs 60. Thus, FIG. 13 shows how the male mold appears in toto before the next step is taken. FIG. 14 shows an enlarged fragment of such mold.

The male mold 63 is hollow, the same as the mold 42 of FIG. 10 and it is surrounded at its open mouth by a laterally extending flange 64. The flange 64 on the side thereof from which the mold extends is channeled close to the line of joinder 65 between the mold portion proper and the flange 64 for the application of a suction line as shown at 43 in FIG. 10. This channel is here indicated at 66, and like the channel 43 is continuous all the way around the flange spaced just outwardly from the line 65. The flange 64 is likewise channeled at an outer position 67 to receive the pneumatic sealing tube 68, also continuous around the periphery of the flange the same as the tube 45.

An additional feature of the male mold 63 is that the flange 64 has holes formed therethrough in registry with the recesses 62 formed in the mold proper. There is one of these holes 69 at each end of each recess 62. All of the holes are equipped with short metal tubes 70 which commence flush with the upper surface of the flange 64 and extend a short distance downwardly from the underface 71 of that flange. These metal tubes are secured in sealing engagement with the side walls of the holes so as to prevent escape of vacuum between them and the holes. The function of these metal tubes will be described shortly.

Referring now to the left hand end of FIG. 13, it will be seen that the first four channels 62 starting from that end have additional tubes 75 partially seated therein. These tubes are continuous from portions 76 where they extend through the metal tubes 75 on one side of the flange 64, up over the top of the mold and down to extend through the metal tubes 70 seated in the holes 69 on the other side of the mold. In the FIG. 13 showing the tubes 75 have merely been placed in position with their top portions offset out of the channels 62.

The purpose of this is to enable the securing of strips of fiber glass cloth material to the mold commencing at the top surface 77 of the flange 64 with an intermediate portion 80 lying down within each of the channels 62 and with side portions 81 and 82 lying against the surface of the mold at either side of the channels and for a short distance outwardly therefrom. Such fiber glass strips impregnated with a suitable resin are of a thickness to provide sufficient strength and to provide reinforcing ribs as will shortly appear. The strips are shown in enlarged form in FIG. 16 as already applied to the recesses 62.

Depending on how fast the resin sets up, how difficult the application to particular groves may be, etc., these strips 80, 81, and 82, may all be applied to the male mold before the tubes 75 are brought into position, or the tubes 75 may be generally positioned in place and offset as seen in FIGS. 13 and 16, the strips of resin impregnated fiberglass 80, 81 and 82, may be seated on the mold and in the channels 62, and then the tubes may be properly seated in the channeled portions 80 of the strips. Here it is to be noted that when both the interior and exterior of the tubes 75 are subjected to atmospheric pressure the tubes (FIG. 19) have a diameter small enough to seat down within the fiber glass covered channels 62.

The purpose of the tubes 75 is to serve as the internal pressure molding element for the transverse reinforcing members. Polyethylene is presently preferred as the material for the tubes 75, though any plastic material which will stretch to a moderate extent and will not be attacked by the resin, is suitable. The tubes 75 need to stretch, for they are kept open to the atmosphere through their open ends while a vacuum is being drawn between the mold elements to pressure mold the product. The atmospheric pressure will thus cause the tubes to swell in the evacuated area and to fit tightly in the pockets provided for them.

Another advantage of having the tubes 75 stretchable, or flexible, is so that they can all be mounted in place on the mold as seen in FIGS. 13, prior to the application of any of the fiber glass strips, 80, 81, and 82, to the mold. Once the tubes are so mounted they may, even though their ends are secured, be lifted sideways out of the channels, thus moving them out of the way to allow the fiber glass strips to be positioned. Then, as soon as each fiber glass strip is put in place, the corresponding tube can be moved back to seat in the channel now lined by the material 80.

When it is advantageous to apply the fiber glass cloth strips and their resin before the tubes 75 are positioned on the male mold, care must be taken not to let resin flow into the metal tubes, such as 70, to sufficient extent to interfere with the subsequent positioning of the ends of the molding tubes 75 in those holes.

For complete positioning of the plastic tubes 75 in place, their ends must extend through the metal tubes 70 as seen in enlarged showings in FIGS. 16 and 17. Then the ends 83 of the tubes 75 are turned back over the outer surface of the metal tubes 70 to a sufficient extent that those ends can be sealed against that outer surface of the metal tubes by means of rubber bands 84 or other suitable holding members. Here again there must be an air tight seal formed where the ends 83 of the rubber bands are held against the metal tubes to prevent any leakage of the vacuum being pulled between the mold elements.

In this form of the invention the application of the subsequent layers of fiber glass and resin to make up the wall of the product is shown in FIGS. 19 and 20 as being carried out with the male mold in upright position. Again a sufficient number of layers of resin and fiber glass as illustrated at 85 may be applied in order to produce the wall thickness desired. These layers, of course, extend from the upper surface 77 of the flange 64 on one side of the mold, or die, up over the top and down over the other side so that the mold is eventually completely and uniformly covered.

Once the layers have been applied to the male mold, the female mold, already formed on the outer surface of the master shell 37, is seated down over the male mold as shown in the exploded view in FIG. 22. The female mold, here indicated generally at 88, again has a surrounding flange 89 which mates up with the flange 64 of the male mold. The mold members 63 and 88 are thus brought together in the same relationship as the molds 42 and 38 in FIG. 10. In this instance vacuum is pulled through the channel 66 in communication with the space between the mold faces and the atmospheric pressure presses the mold members together sealing them against escape of vacuum by means of the pneumatic tube 68. Unwanted air from between the mold elements is drawn out by the vacuum action while the layers of fiber glass and resin 85 are pressed tightly together and formed into a strong dense structure as the resin is cured.

While the vacuum action is effective between the die or mold elements 63 and 88, the interiors of the tubes 75 are kept open to atmosphere by the securement of their ends in open position on the metal tubes 70. Thus, as the pressure about the parts of the tubes 75 within the mold zone decreases, they tend to swell. In doing so they fill all the space available to them, seat themselves tightly in the channels provided and effect an internal pressure molding of reinforcing ribs out of the fiber glass strips 80, 81, and 82. Actually, as seen in cross-section in FIG. 21, the tubes 75 have their inner faces 90 which are seated in the wall material 85, flattened due to the pressure of the die members during the forming and curing stage. When the product is completed then, as seen in FIG. 23, the factor of rigidity then has been built into it to a marked degree in spite of the fact that very little weight has been added in doing so.

Once the material 85 is set, the mold elements are separated. The tube ends 73 are freed, the product is removed from the male die and the tubes withdrawn. A strong smooth finished product results.

The boat hull in FIG. 23 is the same as that of FIG. 11 save that reinforcement has now been added transversely. The hull elements are thus denoted by the same reference characters. The transverse ribs, having the structure shown in FIG. 21 are denoted 91.

As already indicated, the ribs 91 may be of any desired cross-sectional contour. They may also extend in a direction with respect to the member to be reinforced to give the reinforcement desired. Furthermore, though polyethylene has been mentioned as a suitable material for use in making the molding tubes 75, it is to be understood that any type of plastic tubing which will not be attacked by the resin used, and which will stretch to the desired extent, can be used.

In certain instance, it may be necessary or desirable to have solid rib elements in place of the tubes 75 in the final product. This can readily be accomplished by employing such elements as the internal molding members in place of the tubes 75 in laying up the hull forming material. Alternatively, where hollow tubes have been used, the same can be filled with settalble material after the product has otherwise been formed.

The invention also renders it possible to modify the configuration of the master shell by the selective application of differential pressures to such shell in the course of forming the same. Considering the master shell for the forming of a boat hull as described in the foregoing, as a non-limiting example of a form of shell to be modified by such application of pressures, reference is made to the sandwich 21 positioned on the framing as in FIG. 8. When so positioned and before the plastic of the sandwich has set, it will be appreciated by considering FIG. 8 in conjunction with FIGS. 1 and 2, that separate isolated chambers exist between the longitudinal chine members 4 and the keel frame member 5. Also, other isolated chambers will exist between the chine frame members 4 and the base 1. Thus it is possible to create different contours with respect to the portions of the shell bridging the edges of these frame members merely by exerting the desired pressure within the chambers just mentioned. Such pressure may of course be positive, or negative.

Assuming then that in the particular form illustrated it is desired to form a boat with a convexly rounded bottom but with concave sides extending upwardly from such bottom. This can readily be accomplished by introducing positive air pressure by some means such as the tube inserted in the opening of the base 1, into the chambers bordered by the frame member 4 and the keel member 5. This may be considered as all one chamber from a pressure standpoint merely by forming openings in the portion of the keel member 5 where it lies above the frame members 4 as viewed in FIG. 2. Thus the portions of the shell will be outwardly rounded by this positive pressure. At the same time the sides of the shell extending between the edges of the frame member 4 and the shear line around the base 1 may similarly be subjected to a negative pressure by applying such pressure to the isolated chambers bored by the base 1, the chine frames 4 and the short portion of the keel frame extending up from the base 1 to the position where the chine frames depart therefrom. Thus while the portion of the shell to form the bottom of the boat is outwardly rounded by positive pressure, the portions to form the sides may be caused to extend concavely inwardly by the exertion of a negative pressure in the chambers which they overlie. By maintaining these differential pressures constant until the resin sets, the master shell when set will have the modified configuration just referred to.

It is, of course, to be understood that reference to the forming of a rounded bottom and concaved sides is merely illustrative, for differential pressures can be exerted in a variety of ways to produce concave, or convex, configurations of portions of the shell, or to leave portions thereof straight as desired. Furthermore, the possibilities are additionally varied and increased in number as frames for different, or for more complex, structures are employed.

From the foregoing it will be apparent that the invention embraces various and novel factors. Though specific illustrations and description of method and product have been set forth for a disclosure of the invention as required by the statutes, it is of course to be understood that such is for illustrative and not limiting purposes.

I claim:

1. A blank for a master shell to be used in making die elements which comprises, a sandwich formed of a pair of sheets of elastomeric film like material having elastic properties in overlying relationship, a sheet of stretchable reinforcing material positioned between said sheets of film-like material, said film like sheets being sealed together around the borders thereof with said reinforcing sheet therebetween and extending throughout the confines of the envelope formed by the film like sheets and a settable plastic impregnating said reinforcing sheet and filling the remaining space between said film like sheets whereby said film like sheets, said reinforcing sheet and said settable plastic may be formed into the shell shape desired and will retain said shape on setting of said plastic.

2. A blank as in claim 1, the interior of said sandwich within said sealed borders having the air evacuated therefrom.

3. A blank as in claim 1, said film like material having a smooth exterior surface possessing mold release characteristics.

4. Those steps in the method of forming a master shell for use in making mold elements which comprises, forming a sandwich by sealing two sheets of elastomeric film like stretchable material together against each other around their borders with a sheet of stretchable fabric reinforcing material having elastic properties and a settable plastic between said sheets in the space within said borders, holding the borders of said sandwich against lateral deflection causing lateral deflection of a portion of said sandwich within said borders, evacuating the air from the space within said borders containing said plastic and reinforcing material, and setting said plastic to cause said portion of the sandwich to maintain said laterally deflected position.

5. Method steps as in claim 4 and including causing said deflection by forming a seal around said portion to be deflected and causing said deflection by creating a pressure differential between the opposite faces of said sandwich.

6. Method steps as in claim 5 and including inserting a frame of desired contour within said deflected portion, equalizing the pressure between the opposite faces of said sandwich to cause said sandwich to hug the surfaces of said frame and thereafter causing said plastic to set and form a shell having the contours of said frame.

7. Method steps as in claim 6, said frame comprising a series of partitions defining exposed chambers covered by the sandwich, including the step of applying selectively differential pressures within the chambers to modify the configurtaion of the shell prior to the setting of the plastic.

8. The method of forming rigid die elements for the pressure molding of fibrous reinforced plastic elements which comprises, forming a master shell, forming a sandwich of a pair of elastomeric film elements with a settable plastic and a sheet of material having elastic properties therebetween, evacuating the air from within said sandwich, placing said sandwich over an opening of desired size in the cover of a chamber, forcing a portion of said sandwich down through said opening by establishing a pressure differential between the opposite faces of the sandwich, introducing a frame of the mold contours desired into the downwardly drawn concave portion of said sandwich, allowing the pressure to change in said box to cause said sandwich to hug said frame, allowing said plastic to set while said sandwich hugs said frame and, when said sandwich has set into the form of a hollow shell, laying up settable plastic and reinforcing material to the desired thickness on both the interior and exterior surfaces of said shell, to form a pair of die elements, allowing said plastic to set and removing said interior and exterior lay ups.

9. The method as in claim 8 and including forming laterally extending opposed flanges surrounding said die elements and forming a peripheral channel in the face of one of said flanges opening out in opposition to the other of said flanges.

10. The method of reinforcing shell like elements by means of hollow integral reinforcements both formed out of reinforced plastics which comprises, forming a die member with at least one recess in the forming surface, applying a first layer of settable plastic and reinforcing material to said forming surface with a portion seating in said recess and side portions lying alongside of the same, seating an expandable tube in said recess, applying a second layer of reinforcing material and settable plastic across said forming surface, including said recess, applying a second forming surface against the side of the second layer and which bridges the reinforcement-forming recess, causing pressure to be applied to the two forming surfaces to cause the same to be forced toward each other while introducing pressure into the interior of said tube and allowing said plastic to set while said tube is expanded by said pressure.

11. The method of reinforcing shell like elements by means of hollow integral reinforcements both formed out of reinforced plastics which comprises, forming a die member with at least one recess in the forming surface, applying a first layer of settable palstic and reinforcing material to said forming surface with a portion seating in said recess and side portions lying alongside of the same, seating an expandable tube in said recess, applying a second layer of reinforcing material and settable plastic across said forming surface, including said recess, bringing a second die member having a forming surface against the side of the second layer and which bridges the reinforcement-forming recess, reducing the pressure between said dies to cause the same to be forced toward each other by atmospheric pressure while maintaining the interior of said tube open to atmospheric pressure and allowing said plastic to set while said tube is expanded by the differential between said atmospheric and said reduced pressures whereby the reinforced plastic that forms the shell and the reinforced plastic that bridges the recess and the reinforced plastic that forms the hollow reinforcement are all subjected to and formed by substantially equivalent unit pressures regardless of the configuration of the hollow reinforcements.

12. The method as in claim 11 and including providing a plurality of said recesses, extending the same from a border of said die member to an opposite border thereof and seating reinforcing material and tubes in each of said recesses.

13. The method of forming a hollow element of settable plastic reinforced with fibrous material which comprises, laying up said plastic and said fibrous material on the forming surface of one of a pair of die elements forming reinforcements on said hollow element by including reinforcement forming members at spaced positions between layers of said reinforcing material, said reinforcement forming members being formed as expandable hollow tubes, seating the other of said die elements in place with the forming surface thereof over said laid up settable plastic and fibrous material, reducing the air pressure between the opposed forming surfaces of said die elements and allowing the atmospheric pressure to force said die elements toward each other as said plastic material sets with said reinforcement forming members in place, and causing said tubes to expand by maintaining the interiors thereof in communication with a higher pressure while the exteriors are subjected to said reduced air pressure.

14. A blank for a master shell to be used in making die elements which comprises a sandwich formed of a pair of stretchable sheets of film-like material in superimposed relationship, having therebetween a sheet of stretchable reinforcing material impregnated with a thermosetting resinous material, said sandwich being sealed at all of its borders so as to confine the resin impregnated sheet of stretchable reinforcing material therein, said thermosetting resinous material being present within the sealed compartment in a quantity sufficient not only to impregnate said sheet of stretchable reinforcing material but also sufficient to fill the remaining space between said film-like sheets.

15. A process for forming a master shell for use in making mold elements which comprises forming a sandwich by sealing two sheets of film-like stretchable material together against each other around their borders and containing within the confines of the sealed sandwich a sheet of thermosetting resin impregnated stretchable fabric reinforcing material and evacuating the air from the space within said borders containing said thermosetting resinous material and reinforcing material so as to fill the remaining space between said sealed film-like sheets with the thermosetting resin impregnated sheet of stretchable fabric reinforcing material and additional quantities of the thermosetting resinous material.

References Cited

UNITED STATES PATENTS

| | | | |
|---|---|---|---|
| 648,467 | 5/1900 | Nichol | 9—6 |
| 2,454,719 | 11/1948 | Scogland | 156—155 |
| 2,831,534 | 4/1958 | Thaden | 297—418 |
| 2,838,435 | 6/1958 | Hewett | 156—285 XR |
| 2,841,823 | 7/1958 | Hartesveldt | 18—19 |
| 2,995,781 | 8/1961 | Sipler | 264—314 XR |
| 3,113,831 | 12/1963 | Coale | 264—94 XR |
| 3,161,553 | 12/1964 | Visser | 156—156 |

OTHER REFERENCES

Holmes: "Army Sleds For The Arctic," Modern Plastics, April 1952, pp. 115–118 copy in 156–196.

EARL M. BERGERT, *Primary Examiner.*

H. F. EPSTEIN, *Assistant Examiner.*